(12) United States Patent
Kosugi

(10) Patent No.: US 8,730,022 B2
(45) Date of Patent: May 20, 2014

(54) TIRE PRESSURE MONITORING COMMUNICATION METHOD AND SYSTEM

(75) Inventor: Masanori Kosugi, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 115 days.

(21) Appl. No.: 13/584,943

(22) Filed: Aug. 14, 2012

(65) Prior Publication Data

US 2013/0049944 A1    Feb. 28, 2013

(30) Foreign Application Priority Data

Aug. 23, 2011    (JP) ................. 2011-181531

(51) Int. Cl.
*B60C 23/00*    (2006.01)
*B60C 23/04*    (2006.01)

(52) U.S. Cl.
CPC .................... *B60C 23/0408* (2013.01)
USPC ........... 340/447; 340/442; 340/445; 340/448; 340/5.6; 340/12.11

(58) Field of Classification Search
CPC ................................... B60C 23/0408
USPC ............... 340/447, 442, 445, 448, 5.6, 12.11
See application file for complete search history.

(56) References Cited

U.S. PATENT DOCUMENTS

| | | | |
|---|---|---|---|
| 6,292,096 B1 * | 9/2001 | Munch et al. ................. | 340/445 |
| 7,453,350 B2 * | 11/2008 | Kachouh et al. ............. | 340/442 |
| 2010/0316220 A1 | 12/2010 | Yoon et al. | |

FOREIGN PATENT DOCUMENTS

| | | |
|---|---|---|
| DE | 102005059009 | 6/2007 |
| JP | 2006-306202 | 11/2006 |
| WO | 2011/073928 | 6/2011 |

OTHER PUBLICATIONS

Search report from E.P.O., mail date is Nov. 2, 2012.
U.S. Appl. No. 13/585,067 to Masanori Kosugi, filed Aug. 14, 2012.

* cited by examiner

*Primary Examiner* — Tai T Nguyen
(74) *Attorney, Agent, or Firm* — Greenblum & Bernstein, P.L.C.

(57) ABSTRACT

A communication method transmits a detection signal including a valve ID, which is a fixed data string, and detection information, which is a variable data string, performs error detection on the received detection signal, and uses the detection information when there is no error. The communication method generates third data corresponding to the detection information in accordance with a predetermined rule to increase redundancy of the detection information, generates computed data by performing an exclusive disjunction logic operation with the valve ID and data including the detection information and the third data, transmits the detection signal that includes the computed data, receives the detection signal, restores the detection information and the third data by performing an exclusive disjunction logical operation with the received detection signal and the computed data, and determines whether the detection information conforms to the third data.

9 Claims, 3 Drawing Sheets

Fig. 2A Data Required for Transmission
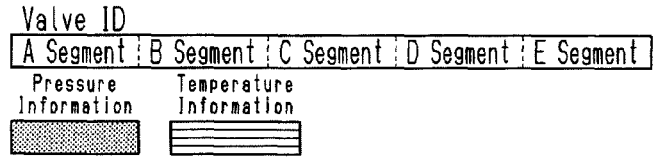
Fig. 2B Data B Used for Computation
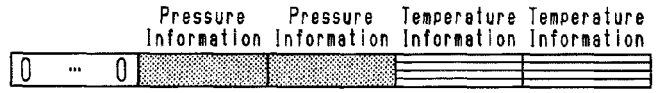
Fig. 2C Computed Data – Transmission Data
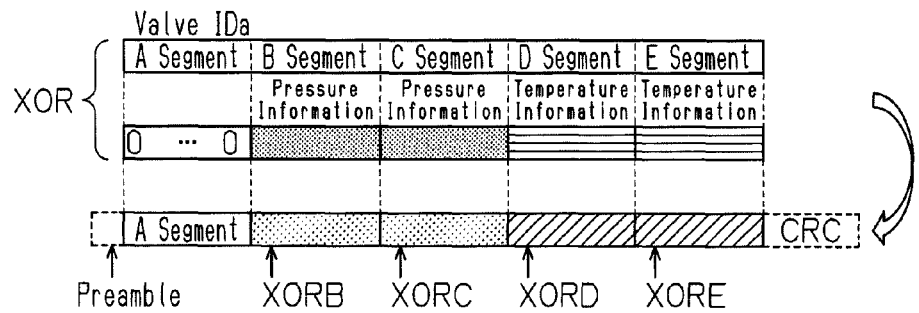
Fig. 3A Received Data – Transmission Data
Fig. 3B Valve IDs
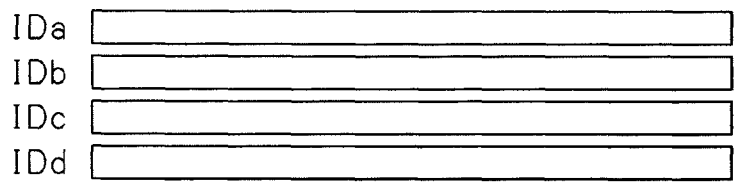
Fig. 3C Computation Result – Exclusive Disjunction of Received Data and Valve IDa
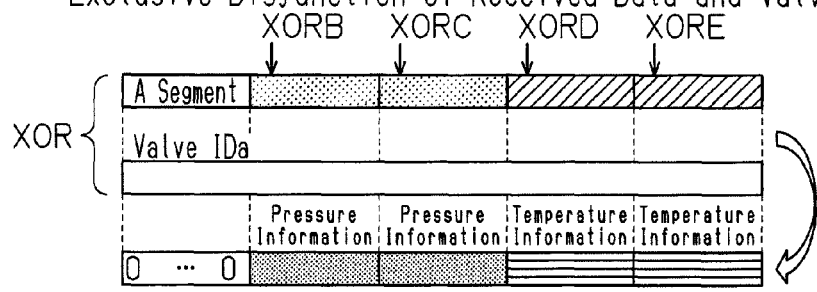

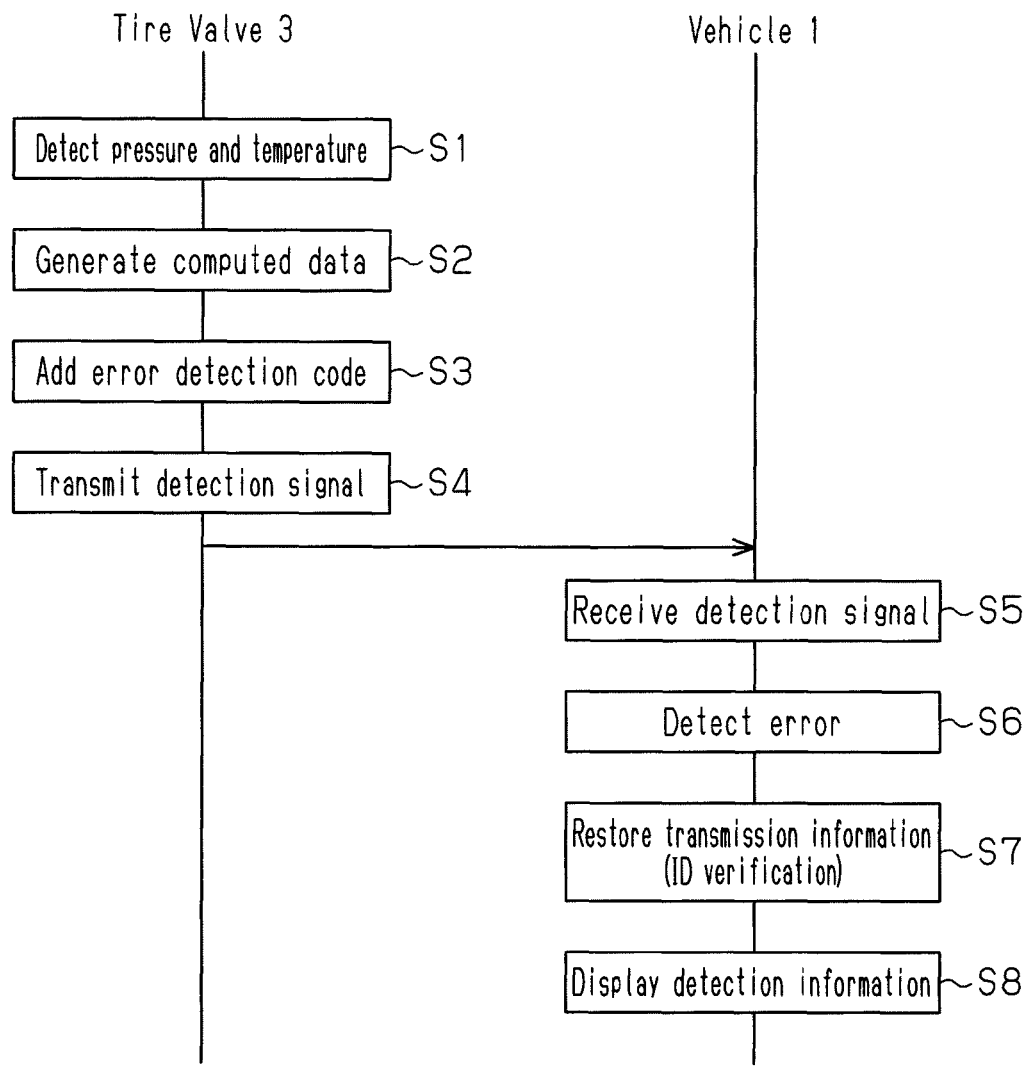

TIRE PRESSURE MONITORING
COMMUNICATION METHOD AND SYSTEM

BACKGROUND OF THE INVENTION

The present invention relates to a communication method and system and, more particularly, to a transmitter, a receiver, and a tire pressure monitoring system that can increase the integrity of transmitted information.

A vehicle may be provided with a tire pressure monitoring system (TPMS) that monitors the tire air pressure. When the vehicle is traveling, the tire pressure monitoring system monitors the tires for air pressure and temperature abnormalities by performing wireless communication with a tire valve, which is arranged on each tire and obtains the air pressure and temperature of the tire.

Each tire valve of the tire pressure monitoring system transmits a wireless signal including detection information, such as the air pressure and the temperature, and an ID code, which is checked by the vehicle. An error detection code is added to the wireless signal for bit error detection (refer to, for example, Japanese Laid-Open Patent Publication No. 2006-306202).

A wireless signal provided with the error detection code may include a large number of bit errors. Under an adverse communication environment in such a situation, the error detection code may erroneously be determined as being normal for one reason or another. To avoid such an erroneous determination, in a wireless signal, redundant information is added to the payload of the data string in addition to the error detection code. More specifically, plural pieces of identical detection information are included in a wireless signal as the redundant information. After receiving the wireless signal, the vehicle checks for errors using the error detection code. Further, the vehicle determines that there are no errors when the plural pieces of detection information are identical.

When increasing the redundant information in the wireless signal to increase redundancy, the data string of the wireless signal is elongated. This increases the amount of the transmission data. It is desirable that such increase in the amount of transmission data be suppressed, while increasing the integrity of the transmitted information. This is not limited to a tire pressure monitoring system and also applies to any system that performs wireless communication.

Accordingly, it is an object of the present invention to provide a communication method, communication system, transmitter, receiver, and tire pressure monitoring system that suppress an increase in the amount of transmission data, while increasing the integrity of the transmitted information.

SUMMARY OF THE INVENTION

One aspect of the present invention is a communication method using first data, which is a fixed data string and stored in advance, and second data, which is a variable data string. The communication method includes generating third data that corresponds to the second data in accordance with a predetermined rule to increase redundancy of the second data, generating exclusive disjunction data by performing an exclusive disjunction logic operation with the first data and data including the second data and the third data, transmitting a wireless signal including the exclusive disjunction data, receiving the wireless signal, restoring the second data and the third data from the exclusive disjunction data by performing an exclusive disjunction logical operation with the first data that is stored in advance and the exclusive disjunction data in the received wireless signal, and determining whether or not the second data corresponds to the third data.

A second aspect of the present invention is a communication system using first data, which is a fixed data string and stored in advance, and second data, which is a variable data string. The communication system includes a transmitter that transmits a wireless signal and a receiver that receives the wireless signal from the transmitter. The transmitter is configured to generate third data that corresponds to the second data in accordance with a predetermined rule to increase redundancy of the second data, generate exclusive disjunction data by performing an exclusive disjunction logic operation with the first data and data including the second data and the third data, and transmit a wireless signal including the exclusive disjunction data. The receiver is configured to receive the wireless signal, restore the second data and the third data from the exclusive disjunction data by performing an exclusive disjunction logical operation with the first data that is stored in advance and the exclusive disjunction data in the received wireless signal, and determine whether or not the second data corresponds to the third data.

A third aspect of the present invention is a transmitter that performs communication using first data, which is a fixed data string, and second data, which is a variable data string. The transmitter includes a control unit configured to generate third data that corresponds to the second data in accordance with a predetermined rule to increase redundancy of the second data, generate exclusive disjunction data by performing an exclusive disjunction logic operation with the first data and data including the second data and the third data, and generate a wireless signal including the exclusive disjunction data. A transmitter is connected to the control unit. The transmitter transmits the wireless signal.

A fourth aspect of the present invention is a receiver that performs communication using first data, which is a fixed data string and stored in advance, and second data, which is a variable data string. The receiver includes a receiver unit that receives a wireless signal including exclusive disjunction data, which is generated by performing an exclusive disjunction logic operation with the first data and data including the second data and third data. The third data corresponds to the second data and is generated in accordance with a predetermined rule to increase redundancy of the second data. A controller is connected to the receiver unit. The controller is configured to restore the second data and the third data from the exclusive disjunction data by performing an exclusive disjunction logical operation with the first data that is stored in advance and the exclusive disjunction data in the received wireless signal and determine whether or not the second data corresponds to the third data.

A fifth aspect of the present invention is a tire pressure monitoring system including the communication system according to the second aspect of the present invention. The transmitter is a tire valve, the receiver is arranged in a vehicle, the first data is a unique valve ID of the tire valve, and the second data is detection information obtained by the tire valve.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2A is a diagram showing the data required for transmission in the tire pressure monitoring system of FIG. 1;

FIG. 2B is a diagram showing the data used for computation during transmission in the tire pressure monitoring system of FIG. 1;

FIG. 2C is a diagram showing computed data during transmission in the tire pressure monitoring system of FIG. 1;

FIG. 3A is a diagram showing received data in the tire pressure monitoring system of FIG. 1;

FIG. 3B is a diagram showing the data used for computation of the received data in the tire pressure monitoring system of FIG. 1;

FIG. 3C is a diagram showing a valve ID in the tire pressure monitoring system of FIG. 1; and FIG. 4 is a sequence chart showing communication performed by the tire pressure monitoring system of FIG. 1.

DETAILED DESCRIPTION OF THE INVENTION

Figure 1:
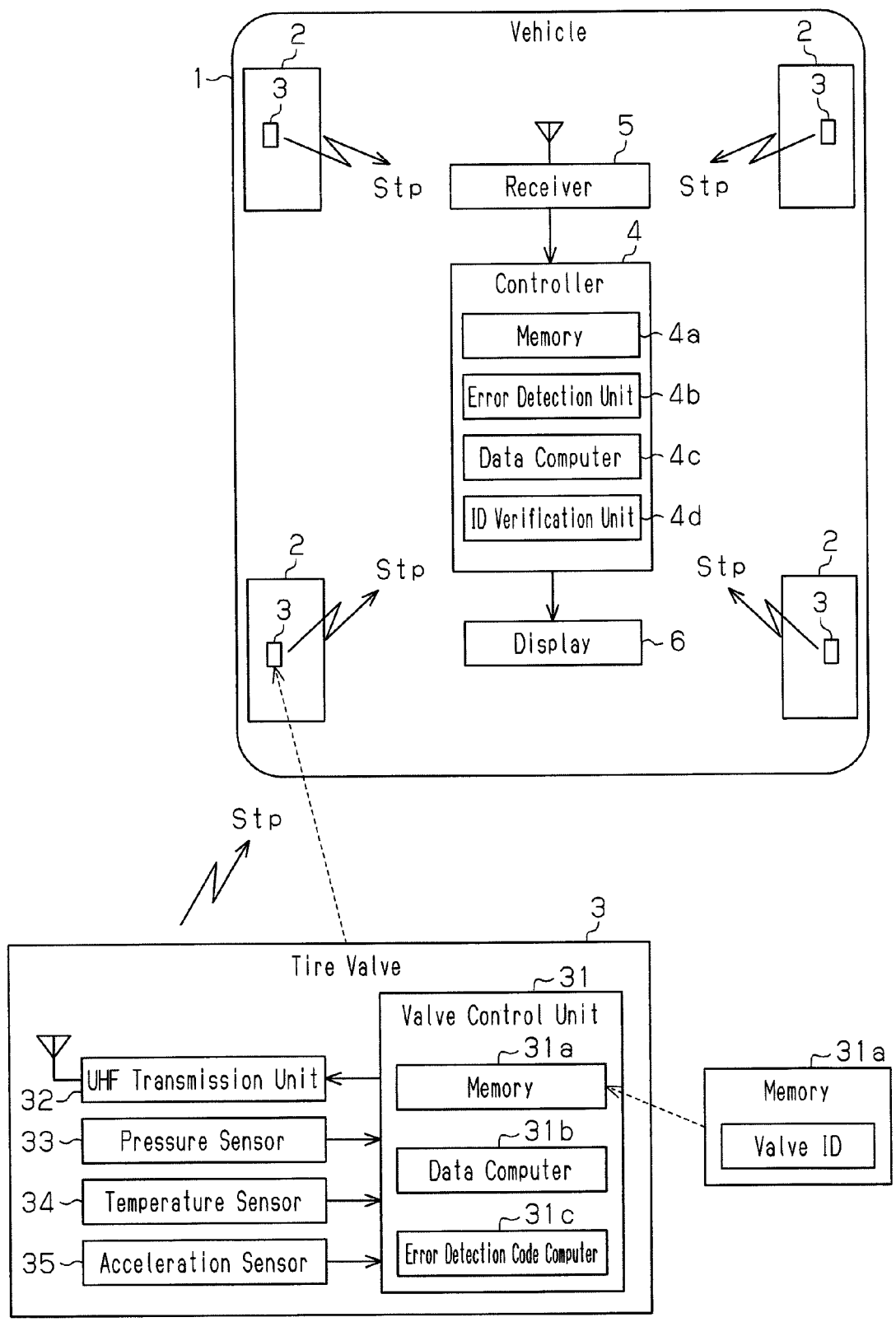
FIG. 1 is a schematic block diagram of a tire pressure monitoring system according to one embodiment of the present invention.

A tire pressure monitoring system (TPMS) for a vehicle according to one embodiment of the present invention will now be described with reference to FIGS. 1 to 4. The tire pressure monitoring system monitors the tires of the vehicle to check for abnormalities in the air pressure and temperature by detecting the air pressure and temperature of the tires.

As shown in FIG. 1, a vehicle 1 includes four tires 2. Each tire 2 includes a tire valve 3, which serves as an air inlet. The tire valve 3 detects the air pressure and temperature of the corresponding tire 2 and transmits a wireless signal. Further, the tire valve 3 includes a valve control unit 31 that controls the operation of the tire valve 3. The valve control unit 31 is connected to a UHF transmission unit 32 that transmits a detection signal Stp, which includes the air pressure and temperature of the corresponding tire 2, on a radio wave in an ultrahigh frequency (UHF) band. The valve control unit 31 includes a memory 31a, which stores valve IDs.

The tire valve 3 also includes a pressure sensor 33, which detects the air pressure of the corresponding tire 2, a temperature sensor 34, which detects the temperature of the corresponding tire 2, and an acceleration sensor 35, which detects the acceleration applied to the corresponding tire 2. The sensors 33 to 35 provide detection signals to the valve control unit 31. The detection signal Stp transmitted by the UHF transmission unit 32 includes the air pressure, temperature, and unique ID (valve ID) of the corresponding tire 2. The UHF transmission unit 32 of each tire valve 3 transmits the detection signal Stp when the corresponding acceleration sensor 35 detects acceleration.

A controller 4, which controls the tire pressure monitoring system, is arranged on a vehicle body of the vehicle 1. The controller 4 is connected to a receiver 5 (receiver unit) that receives the detection signal Stp on the UHF band radio wave transmitted from each tire valve 3 and including the air pressure and temperature of the corresponding tire 2. The controller 4 is also connected to a display 6, which allows for a driver to visually check the air pressure and temperature of the tires 2. The display 6 is arranged in the vehicle 1 near the driver seat.

When the receiver 5 receives a detection signal Stp, the receiver 5 provides the controller 4 with received data that includes a valve ID and detection information. The controller 4 includes an ID verification unit 4d that verifies the valve ID.

The ID verification unit 4d performs ID verification to determine whether or not the valve ID in the detection signal Stp conforms to a valve ID stored in a memory 4a. When the two IDs are in conformation, the ID verification unit recognizes the detection signal Stp as one from a tire 2 registered to the vehicle 1.

The controller 4 reads the air pressure and temperature of the tire 2 from the detection signal Stp and displays the air pressure and temperature of the tire 2 on the display 6. When there is an abnormality in the air pressure or temperature of the tire 2, the controller 4 indicates such a situation on the display 6 or issues a warning. Such operation is repetitively performed whenever the receiver 5 receives a detection signal Stp from a tire valve 3.

The tire pressure monitoring system of the present embodiment employs a communication method that increases the redundancy without increasing the data length. In the tire pressure monitoring system, the valve ID is a fixed data string, and the detection information including the air pressure and temperature is a variable data string. Thus, the valve ID is the same each time the detection signal Stp is received, and the detection information may differ each time the detection signal Stp is received. The valve ID corresponds to first data, which is a fixed data string, and the detection information corresponds to second data, which is a variable data string.

The valve control unit 31 of the tire valve 3 includes a data computer 31b, which computes transmission data, and an error detection code computer 31c, which computes an error detection code. The data computer 31b generates exclusive disjunction data (hereinafter referred to as the computed data) by performing an exclusive disjunction logical operation using the valve ID and data including the detection information and duplicated data of the detection information. Then, the data computer 31b generates transmission data that includes the computed data. The error detection code computer 31c computes an error detection code from the transmission data generated by the data computer 31b. In the present embodiment, a cyclic redundancy check (CRC) code is used as the error detection code. The CRC code can be used to detect a change in part of the data that occurs during transmission. The data computer 31b duplicates the detection information in accordance with a predetermined rule to generate the duplicated data. The duplicated data corresponds to third data, which conforms to the detection information corresponding to the second data.

The controller 4 of the vehicle 1 includes an error detection unit 4b, a data computer 4c, and the ID verification unit 4d. The error detection unit 4b detects an error in the received data using the error detection code. The data computer 4c restores the original data from the received data. The ID verification unit 4d determines whether or not the valve ID verification is accomplished.

The error detection unit 4b performs error detection by computing an error detection code from the payload (computed data) of the received data and determining whether or not the computed error detection code conforms to the error detection code included in the received data. When the error detection unit 4b determines that the received data does not include an error, the data computer 4c restores the detection information and the duplicated data of the detection information by performing an exclusive disjunction logical operation again using the computed data, which was generated by performing the exclusive disjunction logical operation with the valve ID (first data) and data including both of the detection information (second data) and the duplicated data (third data) in the detection information. In this manner, the data computer 4c performs the exclusive disjunction logical operation with the computed data and the stored valve ID to restore the detection information and the duplicated data of the detection information. The valve ID verification unit 4d determines that valve ID verification has been accomplished when the restored detection information corresponds to the restored duplicated data.

The communication method of the tire pressure monitoring system will now be described in detail with reference to FIGS. 2 and 3.

Referring to FIG. 2A, in each valve control unit 31, the data computer 31b reads the valve ID from the memory 31a, acquires pressure information obtained by the pressure sensor 33 and temperature information obtained by the temperature sensor 34, and generates data required for transmission. The data required for transmission includes the valve ID, the pressure information, and the temperature information. The valve ID is divided into five segments, namely, an A segment, a B segment, a C segment, a D segment, and an E segment. The A segment is arranged at the head of the valve ID and used with 0 in an exclusive disjunction logical operation. The B segment is used with the pressure information in an exclusive disjunction logical operation. The C segment is used with the duplicated pressure information in an exclusive disjunction logical operation. The D segment is used with the temperature information in an exclusive disjunction logical operation. The E segment is used with the duplicated temperature information in an exclusive disjunction logical operation. The pressure information and the temperature information correspond to detection information.

Referring to FIG. 2B, to make the detection information redundant, the data computer 31b duplicates the pressure information and the temperature information to generate data B, which is used for a computation. In the data B, the pressure information and the temperature information are arranged at locations corresponding to the B segment to the E segment in the valve ID of the data required for transmission. The data B used for computation is a data string in which 0 is set for each bit in the location corresponding to the A segment of the valve ID, the pressure information is arranged at the location corresponding to the B segment of the valve ID, the pressure information is arranged at the location corresponding to the C segment of the valve ID, the temperature information is arranged at the location corresponding to the D segment of the valve ID, and the temperature information is arranged at the location corresponding to the E segment of the valve ID.

Referring to FIG. 2C, the data computer 31b performs an exclusive disjunction (XOR) logical operation with the valve ID and the data B used for a computation to generate computed data, which serves as exclusive disjunction data. Here, one of the four tire valves 3 having valve IDa will be used as an example to describe the computed data. The data computer 31b computes an exclusive disjunction value XORB of the B segment of the valve IDa and the pressure information, an exclusive disjunction value XORC of the C segment of the valve IDa and the pressure information, an exclusive disjunction value XORD of the D segment of the valve IDa and the temperature information, and an exclusive disjunction value XORD of the D segment of the valve IDa and the temperature information. An exclusive disjunction logical operation that uses 0 does not change the A segment of the valve IDa. The computed data includes the A segment of the valve ID, the exclusive disjunction value XORB, the exclusive disjunction value XORC, the exclusive disjunction value XORD, and the exclusive disjunction value XORD. The computed data forms the payload of the detection signal Stp.

The error detection code computer 31c computes a CRC code, which serves as an error detection code, from the payload generated by the data computer 31b. The valve control unit 31 adds a preamble to the head of the payload and adds the CRC code to the end of the payload to generate transmission data. Then, the valve control unit 31 transmits a detection signal Stp, which includes the transmission data, from the UHF transmission unit 32.

Referring to FIG. 3A, the controller 4 of the vehicle 1 retrieves received data from the detection signal Stp, which is received by the receiver 5. The received data should be identical to the transmission data as long as there are no bit errors. The error detection unit 4b first performs error detection with the CRC on the payload of the received data excluding the preamble to check for bit errors.

Referring to FIG. 3B, the data computer 4c retrieves the valve IDs (Ida, IDb, IDc, and IDd) of the four tire valves 3 from the memory 4a. The data computer 4c performs an exclusive disjunction (XOR) logical operation with the payload of the received data, excluding the preamble and the CRC, and each of the valve IDs (Ida, IDb, IDc, and IDd) to obtain a computation result.

Referring to FIG. 3C, the data computer 4c performs an exclusive disjunction logical operation with the payload of the received data and the valve IDa to restore the detection information and the duplicated detection information. In this manner, the data computer 4c obtains a computation result including the pressure information, the duplicated pressure information, the temperature information, and the duplicated temperature information. When the valve IDa included in the payload of the received data can be obtained by performing an exclusive disjunction logical operation with the payload of the received data and the valve IDa, this indicates that the received data includes the valve IDa, or that ID verification has been accomplished. When the payload includes a valve ID that differs from the valve IDa, the valve IDa is not eliminated and the detection information and duplicated detection information cannot be obtained. Thus, when the detection information corresponds to the duplicated detection information in the computation result, the ID verification unit 4d determines that ID verification has been accomplished.

The procedures for communication in the tire pressure monitoring system will now be described with reference to FIG. 4. In steps S1 to S10, the tire valve 3 transmits a detection signal Stp including detection information to the vehicle 1, and the vehicle 1 receives the detection signal Stp and displays the detection information.

As shown in FIG. 4, the tire valve 3 detects the pressure and temperature (step S1). More specifically, in the tire valve 3, when the acceleration sensor 35 detects acceleration, the pressure sensor 33 provides pressure information to the valve control unit 31, and the temperature sensor 34 provides temperature information to the valve control unit 31.

When the pressure and temperature are detected, the tire valve 3 generates computed data (step S2). More specifically, to obtain redundancy, the data computer 31b duplicates the pressure information and the temperature information and generates a payload by performing an exclusive disjunction (XOR) logical operation with the valve ID and the data string including the pressure information, the temperature information, the duplicated pressure information, and the duplicated temperature information.

The tire valve 3 adds an error detection code to the payload (step S3). More specifically, the error detection code computer 31c computes a CRC code of an error detection code from the payload and adds the CRC code to the payload. Further, the valve control unit 31 adds a preamble to the head of the payload to generate transmission data.

Then, the tire valve 3 transmits the detection signal Stp (step S4). More specifically, the valve control unit 31 transmits a detection signal Stp including the generated transmission data from the UHF transmission unit 32.

The vehicle 1 receives the detection signal Stp from the tire valve 3 (step S5). More specifically, the controller 4 retrieves received data from the detection signal Stp, which is received by the receiver 5.

The vehicle 1 performs error detection on the received data (step S6). More specifically, the error detection unit 4b performs error detection with the CRC on the payload of the received data excluding the preamble to check for bit errors. When determining that there is no error, the error detection unit 4b continues computation with the received data.

The vehicle 1 restores the transmission information from the received data and performs ID verification (step S7). More specifically, the data computer 4c reads the valve IDa from the memory 4a and performs an exclusive disjunction logical operation with the payload of the received data and the valve IDa to restore the detection information and the duplicated detection information. When the detection information and duplicated detection information correspond to each other, the ID verification unit 4d can restore the detection information and the duplicated detection information from the payload of the received data. In this case, the ID verification unit 4d determines that ID verification of the valve IDa has been accomplished. Thus, the controller 4 recognizes that the detection signal Stp is from one of the tires 2 registered to the vehicle 1.

When ID verification is accomplished, the vehicle 1 displays the detection information on the display 6 (step S8). More specifically, the controller 4 displays the air pressure and temperature of the corresponding tire 2 on the display 6. When there is an abnormality in the air pressure or temperature of the tire 2, the controller 4 indicates such a situation on the display 6 or issues a warning.

In the tire pressure monitoring system of the present embodiment, the detection information of the detection signal Stp transmitted from the tire valve 3 to the vehicle 1 is made redundant without increasing the data length. More specifically, the tire valve 3 duplicates the detection information to obtain redundancy and performs an exclusive disjunction logical operation with the valve ID and a data string of the detection information and duplicated detection information to include the detection information and the duplicated detection information in the valve ID. Thus, the tire pressure monitoring system of the present embodiment prevents the data length from being elongated by an amount corresponding to the detection information and the duplicated detection information.

Further, the vehicle 1 performs an exclusive disjunction logical operation with the received data and the valve ID to restore the detection information and the duplicated detection information and check whether or not the detection information includes an error. When the detection information does not include an error, this indicates that ID verification has been accomplished. Thus, the valve ID can be restored from the received data, which is redundant but not increased in length. At the same time, errors in the detection information can be detected and ID verification can be performed. Thus, the integrity of the detection information can be increased without increasing the transmission data. Further, computing processes required for the ID verification can be reduced.

The tire pressure monitoring system of the above embodiment has the advantages described below.

(1) The valve control unit 31 duplicates the detection information to make the detection information redundant. Then, the valve control unit 31 performs an exclusive disjunction logical operation with the valve ID and the data string of the detection information and the duplicated detection information to generate the computed data. Thus, the payload of the transmission data has the same length as the data string including the valve ID. In the prior art, the payload of the transmission data is formed by a data string including the valve ID and two pieces of the detection information. In the present embodiment, the duplicated redundant data increases redundancy while decreasing the length of the transmission data by an amount corresponding to two pieces of the detection information. Thus, the integrity of the detection information can be increased without increasing the transmission data.

Further, the controller 4 performs an exclusive disjunction logical operation with the received data and a stored valve ID to restore the detection information and the duplicated detection information. When the detection information corresponds to the duplicated detection in the computation result, the controller 4 determines that there are no errors and employs the received data of the received detection signal Stp. In this manner, the controller 4 can perform bit error detection on the detection information and the duplicated detection information at the same time as when restoring the detection information and the duplicated detection information. When the detected information and the duplicated detection information can be restored, this indicates that the valve ID in the received computed data conforms to a stored valve ID and that verification has thus been accomplished. This reduces computing processes when verifying the valve ID. When storing a plurality of valve IDs in the memory 4a of the vehicle 1, an exclusive disjunction logical operation is performed with the received data and each of the IDs. In this case, correspondence of the detection information and the duplicated detection information in the computation result can be checked to restore the detection information and the duplicated detection information and perform error detection on the detection information and the duplicated detection information.

(2) The detection signal Stp includes a CRC code obtained from the computed data. Thus, error detection can be performed with the CRC before restoring the detection information and the duplicated detection information. When an error is detected, the detection information and the duplicated detection information will not be restored. This simplifies the receiving process. Further, when a data string including a bit error is received, the error detection code obtained from the received data may erroneously conform to the error detection code in the received data for one reason or another. Nevertheless, the duplicated detection information will not conform to the original detection information. Thus, an error can be detected.

(3) In the system of the present embodiment, the data length is not increased. Thus, less power is consumed during transmission of the detection signal Stp. This reduces power consumption in the tire valve 3 that is driven by a battery.

It should be apparent to those skilled in the art that the present invention may be embodied in many other specific forms without departing from the spirit or scope of the invention. Particularly, it should be understood that the present invention may be embodied in the following forms.

In the above embodiment, the detection information may be set at any location in the data string of the valve ID when performing an exclusive disjunction logical operation with the valve ID and the detection information as long as the same location is used by the valve control unit of the tire valve and the controller of the vehicle.

In the above embodiment, the pressure information and the temperature information are included as detection information in the detection signal Stp. However, there is no such limitation, and information for monitoring the tire pressure and issuing a warning may be included as detection information in the detection signal Stp. For example, the detection signal Stp may include status information indicating a sudden pressure decrease as the detection information. Further, the detection signal Stp may include only the pressure information as the detection information.

In the above embodiment, the valve ID is used as the first data. However, an initial set value, which is fixed during normal use, may be employed as the first data. More specifically, the computed data may be generated through an exclusive disjunction logical operation performed with the initial setting value and the detection information. Further, the valve ID and the initial setting value may be used as the first data.

In the above embodiment, the detection information, which serves as the second data, is duplicated, and the duplicated data, which corresponds to the second data, is used as the third data. However, a computation may be performed on the second data in accordance with a predetermined rule to obtain data, which is used as the third data. For example, data obtained by inverting every bit of the second data, data obtained by adding a given number to the second data, or data obtained by inverting only a lowermost rank bit of the second data may be used as the third data.

In the above embodiment, the detection signal Stp may be encoded. For example, after adding the error detection code to the detection signal Stp (step S3), the detection signal Stp may be encoded, and the encoded detection signal Stp may be transmitted to the vehicle 1 (step S4). In this case, after the encoded detection signal Stp is received (step S5), the vehicle 1 decodes the encoded detection signal Stp.

In the above embodiment, error detection is performed with a CRC. Instead, other error detections codes, such as a parity bit, may be used.

In the above embodiment, the communication method according to the present invention is applied to the tire pressure monitoring system but may be applied to a communication system that transmits a wireless signal including information requiring redundancy.

The present examples and embodiments are to be considered as illustrative and not restrictive, and the invention is not to be limited to the details given herein, but may be modified within the scope and equivalence of the appended claims.

The invention claimed is:

1. A communication method using first data, which is a fixed data string and stored in advance, and second data, which is a variable data string, the communication method comprising:
   generating third data that corresponds to the second data in accordance with a predetermined rule to increase redundancy of the second data;
   generating exclusive disjunction data by performing an exclusive disjunction logic operation with the first data and data including the second data and the third data;
   transmitting a wireless signal including the exclusive disjunction data;
   receiving the wireless signal;
   restoring the second data and the third data from the exclusive disjunction data by performing an exclusive disjunction logical operation with the first data that is stored in advance and the exclusive disjunction data in the received wireless signal; and
   determining whether or not the second data corresponds to the third data.

2. The communication method according to claim 1, further comprising
   after generating the exclusive disjunction data, computing an error detection code from the exclusive disjunction data,
   wherein the transmitting a wireless signal includes transmitting the wireless signal including the exclusive disjunction data and the error detection code, and
   the method further includes
   detecting an error in the received wireless signal using the error detection code included in the received wireless signal.

3. A communication system using first data, which is a fixed data string and stored in advance, and second data, which is a variable data string, the communication system comprising:
   a transmitter that transmits a wireless signal; and
   a receiver that receives the wireless signal from the transmitter;
   wherein the transmitter is configured to
      generate third data that corresponds to the second data in accordance with a predetermined rule to increase redundancy of the second data,
      generate exclusive disjunction data by performing an exclusive disjunction logic operation with the first data and data including the second data and the third data, and
      transmit a wireless signal including the exclusive disjunction data; and
   the receiver is configured to
      receive the wireless signal,
      restore the second data and the third data from the exclusive disjunction data by performing an exclusive disjunction logical operation with the first data that is stored in advance and the exclusive disjunction data in the received wireless signal, and
      determine whether or not the second data corresponds to the third data.

4. The communication system according to claim 3, wherein
   the transmitter is configured to
      compute an error detection code from the exclusive disjunction data after generating the exclusive disjunction data, and
      transmit the wireless signal including the exclusive disjunction data and the error detection code; and
   the receiver is configured to detect an error in the received wireless signal using the error detection code included in the received wireless signal.

5. A transmitter that performs communication using first data, which is a fixed data string, and second data, which is a variable data string, the transmitter comprising:
   a control unit configured to generate third data that corresponds to the second data in accordance with a predetermined rule to increase redundancy of the second data, generate exclusive disjunction data by performing an exclusive disjunction logic operation with the first data and data including the second data and the third data, and generate a wireless signal including the exclusive disjunction data; and
   a transmitter connected to the control unit, wherein the transmitter transmits the wireless signal.

6. The transmitter according to claim 5, wherein
   the control unit is configured to compute an error detection code from the exclusive disjunction data after generating the exclusive disjunction data, and the transmitter is configured to transmit the wireless signal including the exclusive disjunction data and the error detection code.

7. A receiver that performs communication using first data, which is a fixed data string and stored in advance, and second data, which is a variable data string, the receiver comprising:
- a receiver unit that receives a wireless signal including exclusive disjunction data, which is generated by performing an exclusive disjunction logic operation with the first data and data including the second data and third data, wherein the third data corresponds to the second data and is generated in accordance with a predetermined rule to increase redundancy of the second data; and
- a controller connected to the receiver unit, wherein the controller is configured to restore the second data and the third data from the exclusive disjunction data by performing an exclusive disjunction logical operation with the first data that is stored in advance and the exclusive disjunction data in the received wireless signal and determine whether or not the second data corresponds to the third data.

8. The receiver according to claim 7, wherein the controller is configured to detect an error in the received wireless signal using the error detection code included in the received wireless signal.

9. A tire pressure monitoring system comprising:
the communication system according to claim 3, wherein
the transmitter is a tire valve,
the receiver is arranged in a vehicle,
the first data is a unique valve ID of the tire valve, and
the second data is detection information obtained by the tire valve.

* * * * *